United States Patent [19]

Winckelmann

[11] Patent Number: 5,060,589
[45] Date of Patent: Oct. 29, 1991

[54] SYSTEM FOR ALLEVIATING THE EFFECTS OF OIL TANKER OIL SPILLS

[76] Inventor: Emil V. Winckelmann, 3108 Blossom La., Redondo Beach, Calif. 90278

[21] Appl. No.: 553,129

[22] Filed: Jul. 16, 1990

[51] Int. Cl.$^5$ .............................................. E02B 15/04
[52] U.S. Cl. .................................................. 114/74 R
[58] Field of Search ................ 114/74 T, 74 R, 77 R, 114/256, 364, 375; 405/66, 67, 68, 69, 210

[56] References Cited

U.S. PATENT DOCUMENTS

| | | | |
|---|---|---|---|
| 2,316,431 | 4/1943 | Hooley | 114/375 |
| 2,347,412 | 4/1944 | Higgins | 114/375 |
| 2,751,953 | 6/1956 | Grimm | 114/74 T |
| 3,282,361 | 11/1966 | Mackie | 114/74 T |
| 4,227,477 | 10/1980 | Preus | 114/74 T |
| 4,480,800 | 11/1984 | Oberg et al. | 405/68 |
| 4,709,650 | 12/1987 | Ingle | 114/375 |
| 4,960,347 | 10/1990 | Strange | 114/256 |

FOREIGN PATENT DOCUMENTS 730652  5/1955  United Kingdom .............. 114/74 T

Primary Examiner—Jesûs D. Sotelo
Assistant Examiner—Stephen P. Avila

[57] ABSTRACT

A system for alleviating oil spills from an oil tanker which includes a pump having an intake extending into the oil compartment within the tanker, and a flexible container coupled to the pump for receiving oil from the pump. The flexible and collapsible container is adapted to be lowered over the side of the oil tanker as it is receiving oil from the pump, so that the container floats along side of the vessel until its oil is reclaimed.

3 Claims, 2 Drawing Sheets

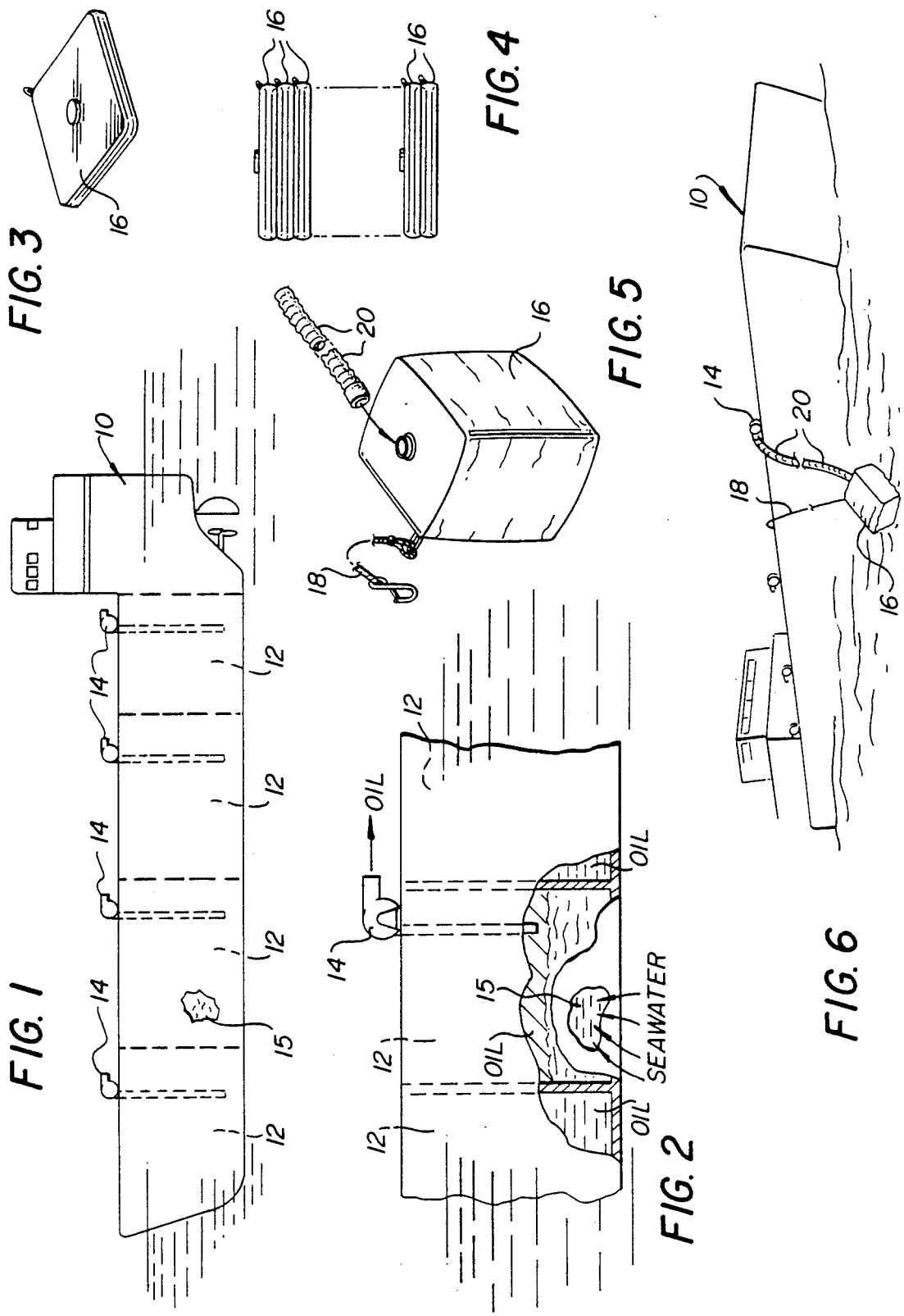

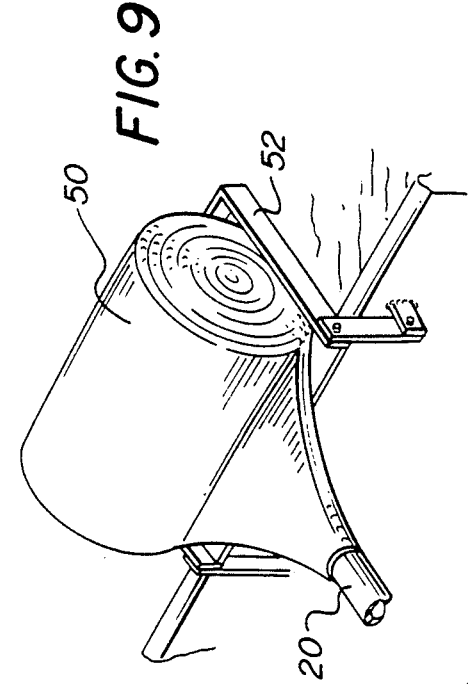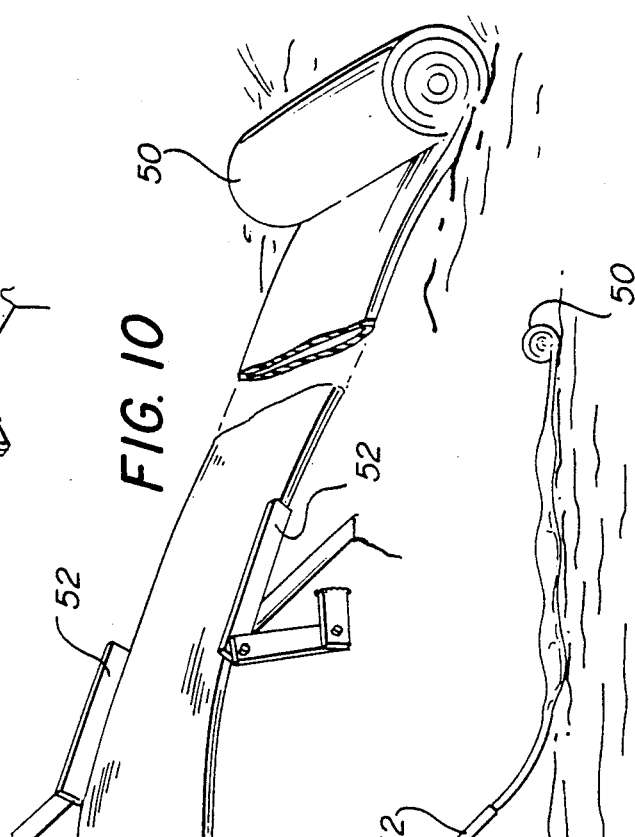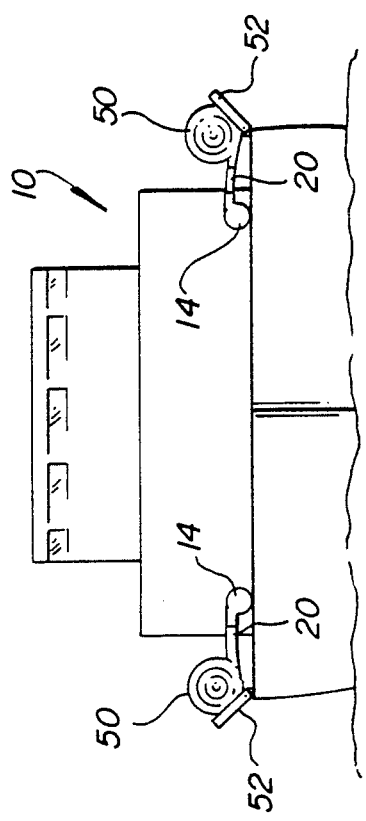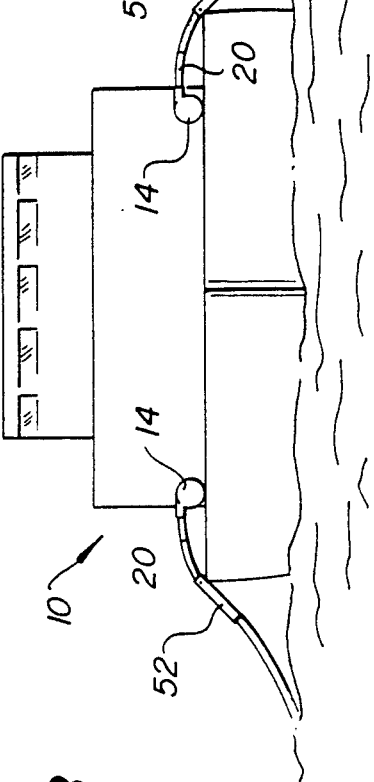

SYSTEM FOR ALLEVIATING THE EFFECTS OF OIL TANKER OIL SPILLS

BACKGROUND OF THE INVENTION

Oil spills from oil tankers have become prevalent in recent years with devastating results. Many methods and devices have been suggested in the past for preventing such oil spills; and for cleaning up, or at least containing, such oil spills after they have occurred. However, for the most part such prior art devices and systems for one reason or another have remained largely ineffective.

The system of the present invention is predicated upon the known fact that when an oil tanker strikes an object which pierces its hull, the oil in the affected compartment of the tanker is pushed out and replaced by the heavier seawater, until it reaches the highest point of the hole. The oil in the compartment is then trapped above the water and stops leaking out.

Prior to the present invention, it was the practice for everyone to stand helplessly by as the oil slowly flowed out of the damaged oil tanker, or at least until auxiliary equipment could be brought alongside of the damaged vessel to pump the oil out of the leaking compartment.

The principle object of the system of the present invention is to provide a means for pumping the oil out of the damaged compartment immediately after the occurrence of the accident, so as to minimize the amount of oil escaping to the sea.

In accordance with the teaching of the present invention, the oil is pumped out of the damaged compartment by a pump permanently mounted on the ship whose intake extends into the compartment, and the oil is pumped into a collapsible container which is carrier by the vessel, and which has been lowered into the sea over the side of the vessel. The filled container then floats in the water until its oil may be subsequently recovered. An appropriate number of such containers are carrier on the vessel.

BRIEF DESCRIPTION OF THE DRAWINGS

FIG. 1 is a side elevational view of an oil tanker equipped with oil pumps permanently mounted on the vessel with their intakes extending into the corresponding oil compartments;

FIG. 2 is an enlarged schematic representation of one of the containers of the vessel of FIGURE showing the manner in which sea water enters the compartment through a hole in the hull to displace oil originally carried in the compartment;

FIG. 3 is a perspective representation of a suitable collapsible container which is carrier by the oil tanker of FIG. 1;

FIG. 4 shows a stack of containers of the type shown in FIG. 3;

FIG. 5 shows a container of FIG. 3 after it has been filled with oil from the compartment of the ship;

FIG. 6 is another view of the oil tanker of FIG. 1, and showing the manner in which the container of FIG. 5, is filled with oil pumped from a compartment within the oil tanker, after it has been lowered over the side of the vessel;

FIG. 7 is a front elevational view of another oil tanker, and which uses sleeve-like bags as the oil containers, which are mounted in a coiled configuration in readiness for use;

FIG. 8 is a view like FIG. 7, and showing the sleeve containers (call them that) of FIG. 7 being filled with oil and dropped over the side of the oil tanker;

FIG. 9 is an enlarged perspective view of the sleeve bags of FIG. 7, and shows the manner in which they are normally supported on the ship; already connected or ready to be connected to the pump; and FIG. 10 is a perspective view showing the manner in which the sleeve containers are released over the side of the ship and into the sea.

DETAILED DESCRIPTION OF THE ILLUSTRATED EMBODIMENT

An oil tanker 10 is illustrated in FIG. 1 which comprises a number of independent compartments 12, each of which is filled with oil during the normal operation of the ship. The ship 10, as shown in FIG. 1, is represented as having struck an object which pierces the hull of the ship and causes a hole 15 to appear in the hull and into the corresponding compartment 12. As shown in FIG. 2, this damage to the hull causes sea water to flow in through the opening 15 and into the corresponding compartment. The entrance of sea water into the compartment causes the oil, which is lighter than water, to float on top of the water, and during a usual sequence of events, the oil would seep out through the hole 15 and into the surrounding ocean, causing an oil slick.

In the practice of the present invention, a pump 14 is mounted adjacent to each of the compartments 12 with the intake of each pump extending down into the corresponding compartment. If so desired, the intake of each pump may be coupled through appropriate valves to several compartments 12, so that several pumps may be used to pump oil from an affected compartment, if so desired. Also in accordance with the present invention, a plurality of collapsible containers 16 (FIG. 3) are carried, for example, in a stacked form (FIG. 4) on the vessel.

Immediately after the hull of the vessel has been pierced and sea waters begin to flow in through the hole 15, one of the containers 16 . . . is coupled to the pump of the affected compartment, and lowered over the side of the ship into the sea by an appropriate line 18, and is held alongside the ship by the line. The oil within that compartment is immediately pumped into the container 16 through a hose 20 (FIG. 5) until the particular container 16 is filled. As one of the containers 16 becomes filled, it is replaced by another container, and this action continues until the oil has been pumped from the compartment.

Although the system of the invention does not totally prevent oil spills, it causes the oil flowing into the sea to be stopped within a relatively short time, before a massive oil slick has been created. As the pumping action continues, the sea water is drawn into the compartment through the hole 15, as shown in FIG. 2, so that the flow of oil through the hole is immediately stopped, as the oil is being pumped into the various containers 16.

In the embodiment of FIGS. 7-10 the containers 16 are replaced by flexible sleeve bags 50 which are normally stored in a rolled condition, as shown in FIG. 9 on a bracket 52 at each side of the ship, and adjacent each compartment, the sleeve bags are permanently coupled to the pumps 14. Then, should an accident occur causing the hull of the ship to be pierced, the brackets 52 are immediately released to the condition shown in FIG. 10, and the sleeve bag adjacent the damaged compartment is rolled into the sea, as shown.

Then, the pump is started up, and immediately starts pumping oil into the corresponding sleeve. As before, the flow of oil out of the damaged compartment is, in this way, terminated almost immediately, to minimize the amount of oil escaping from the vessel.

The invention provides, therefore, a simple and economically feasible system for coping with the escape of oil from an oil tanker should its hull become pierced.

It will be appreciated that while particular embodiments of the invention have been shown and described, modifications may be made. It is intended in the claims to cover all modifications which come within the true spirit and scope of the invention.

I claim:

1. A system for cutting off the escape of oil from an oil tanker after the hull of the tanker has been pierced, said system comprising: a pump having an intake extending into the interior of the tanker to pump oil from the interior; an elongated flexible sleeve bag normally stored on the oil tanker in a roller condition and coupled to the outtake of the pump to receive the oil pumped by the pump; and a releasable bracket for supporting the rolled sleeve bag adjacent to the side of the tanker to permit the sleeve bag to roll into the water adjacent to the tanker to receive oil from the pump immediately upon actuation of the pump.

2. The system defined in claim 1 in which the oil is carried in a compartment in the interior of the oil tanker and the pump is mounted on the tanker adjacent to the compartment with its intake extending into the compartment.

3. The system defined in claim 2, in which the oil tanker has a plurality of separate compartments for carrying oil, and which includes a corresponding plurality of pumps permanently mounted adjacent to the respective compartments with their intakes extending into one or more of respective ones of the compartment, and a corresponding plurality of sleeve bags respectively coupled to the pump and a corresponding plurality of releasable brackets for supporting the sleeve bags adjacent to one or both sides of the tanker.

* * * * *